Figure 1:
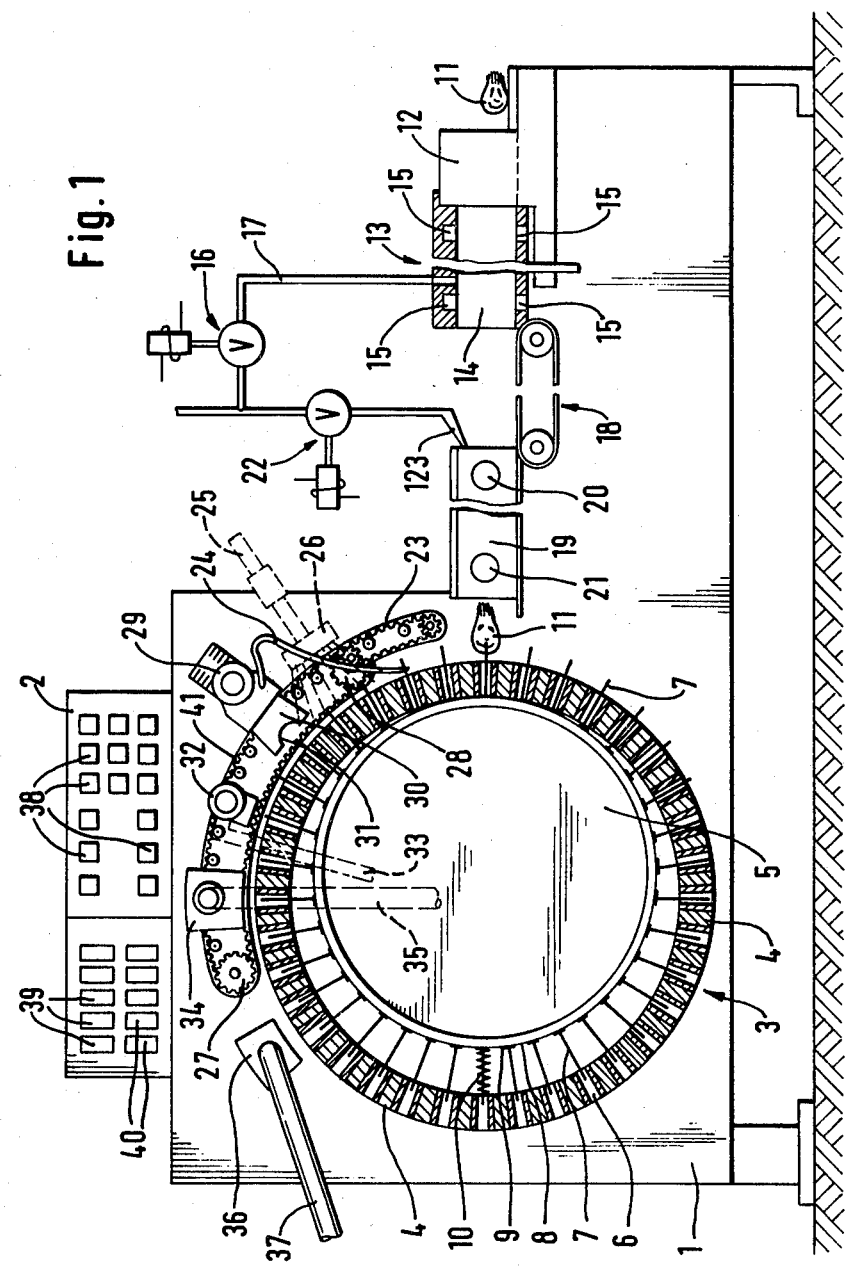

United States Patent [19]

Schmidt

[11] 4,222,153
[45] Sep. 16, 1980

[54] METHOD OF AND APPARATUS FOR SHELLING SHELLFISH SUCH AS PRAWNS OR SHRIMPS

[75] Inventor: Karin Schmidt, Bramsche, Fed. Rep. of Germany

[73] Assignee: Firma Geba Geratebau GmbH, Bramsche, Fed. Rep. of Germany

[21] Appl. No.: 972,122

[22] Filed: Dec. 21, 1978

[30] Foreign Application Priority Data

Dec. 27, 1977 [DE] Fed. Rep. of Germany ....... 2758233

[51] Int. Cl.³ .............................................. A22C 29/02
[52] U.S. Cl. ........................................... 17/73; 17/48
[58] Field of Search .................................. 17/48, 71, 73

[56] References Cited

U.S. PATENT DOCUMENTS

| | | |
|---|---|---|
| 3,278,983 | 10/1966 | Martin ....................................... 17/48 |
| 3,758,921 | 9/1973 | Ingalls ....................................... 17/71 |
| 3,787,928 | 1/1974 | Domecki ................................... 17/71 |
| 4,087,887 | 5/1978 | Hoffman et al. .......................... 17/73 |

Primary Examiner—Willie G. Abercrombie
Attorney, Agent, or Firm—Allison C. Collard; Thomas M. Galgano

[57] ABSTRACT

Prawns and like shellfish are shelled by holding them at the tail end, cutting the shell at a point between head and tail, drawing off the head which is discarded, and then drawing the flesh out of the tail part of the shell which is still clamped. Apparatus for performing the shelling comprises a prawn holder which moves sequentially past devices for clamping, cutting and applying suction to the prawns.

15 Claims, 2 Drawing Figures

METHOD OF AND APPARATUS FOR SHELLING SHELLFISH SUCH AS PRAWNS OR SHRIMPS

The invention relates to method and apparatus for the shelling of shellfish. Prawns and shrimps (*Crangon Vulgaris*) are examples of such shellfish. In the following Specification, prawns only will be referred to, for the sake of brevity, but is to be understood that the invention is equally applicable to other shellfish of similar form.

Heretofore, in order to withdraw the meat from the prawns, the shell consisting of successively arranged rings had to be broken open manually. For this purpose the prawns are pulled apart at the second ring following the head shell, whereupon the meat is pulled out. Up until now, no mechanical apparatus has been known which ensures the continuous shelling of prawns with a satisfactory efficiency.

According to the invention, there is provided a method of shelling prawns, wherein each prawn is held fast at the tail, the prawn shell is divided roughly in the middle between head and tail, on the belly side, the head shell is drawn off and the prawn flesh is drawned out of the clamped tail shell.

The invention also provides apparatus for mechanically shelling prawns, comprising a prawn holder, a feeder device for the continuous positioned supply of individual prawns to the prawn holder, a clamping device operative on the propelling tail of each prawn located in the holder, at least one guiding and spreading element for extending and straightening the clamped prawn, a cutter mechanism which at least partly cuts off the head, a first removal device for removing the head of the prawn, a second removal device for pulling the meat out of the beheaded prawn, and a third removal device for removing the empty shell of the prawn, the prawn holder being arranged to travel past the removal devices.

The feeder device ensures a continuous supply of single prawns to the prawn holder. Since the prawns are curled up by the cooking process after the catch, each prawn body fed to the prawn holder must first be extended before the shelling process can begin. For this purpose the prawns are held in the prawn holder by a clamping device which remains in action during the entire shelling process. Guiding and spreading elements are employed for extending the prawn bodies.

First each prawn travels through a cutter mechanism which cuts through the prawn shell by means of a cutter between the second and the third ring on the belly side. The prawn which has thus been partly cut is then fed by means of the prawn holder to a removal device for the head of the prawn. As soon as the prawn head has been removed, the meat projects from the tail shell and can be withdrawn by means of a second removal device. Thereafter the clamping device releases the empty tail shell, so that the latter can be removed by means of a third removal device.

In a preferred embodiment the prawn holder is constructed in the form of a rotatable disc which comprises prawn receptacles at the periphery. Each prawn receptacle is supplied by the feeder device with a prawn in a predetermined position in such a manner that the back shell of the prawn lies against the periphery of the disc. Upon rotational movements of the disc the prawns held there are guided singly past the cutter mechanism and the individual removal devices, one after the other.

Each prawn receptacle is associated with spikes which protrude radially from the disc and are arranged in pairs one adjacent the other, so that a prawn is always held by two spikes. Since the spikes penetrate through the prawn shell into the meat to be withdrawn, it is provided that the spikes are radially withdrawn into the disc as soon as the meat is to be pulled away by means of the second removal device. A control cam is provided for this movement of the spikes. For example, thin needles may be used as spikes.

In a preferred embodiment, the feeder device, the clamping device, the guiding and spreading elements, the cutter mechanism and the first, second and third removal devices are arranged one behind the other in the direction of rotation of the disc in the region of the periphery of the disc. In order to hold the prawns securely during their travel through the treatment stations, the clamping device provided for this purpose is the lower run of at least one endless travelling belt which lies against the periphery of the disc in a predetermined region, the disc being the counter support. The prawns supplied by the feeder device to the prawn receptacles are clamped, while the disc continues to run, between the lower run of the endless travelling belt of the clamping device and the disc so that the prawns are fixed. In an advantageous manner the clamping device is so arranged that merely the propelling tail of each prawn is clamped at the outer end between the endless travelling belt and the disc. The travelling belt used may be a toothed belt which offers the advantage that slip is avoided with certainty. However, plungers or like clamping elements may also be used as a clamping device.

The guiding and spreading elements provided for aligning the initially arched prawn bodies are fingers which protrude into the path of each prawn carried by the prawn holder. They extend the arched prawn body while it is conveyed under the fingers.

In addition to the fingers, a friction element which contacts the surface of each prawn guided past, e.g. a brush, may be provided which, additionally to the extension by the fingers, rotates the prawn body about the longitudinal axis, in order that the belly side of the prawn is always turned away from the outside of the disc.

After the alignment of each prawn, the latter travels first past the cutter mechanism which preferably has a cutter which is displaceable radially and simultaneously axially relatively to the disc in a synchronous manner. Thereby the prawn shell is cut, and owing to the movement of the cutter axially in relation to the disc, the separating cut is enlarged in the longitudinal direction of the prawn body, so that the head is loosened. The blade of the cutter has a recess which corresponds to the diameter of a prawn. This ensures that only the shell is severed and the meat remains undamaged and coherent.

As soon as the head has been severed, it is carried away by a first removal device. The prawn meat which projects from the head-less prawn shell may then be pulled out of the shell by means of the second removal device.

Even the removal of the empty prawn shell may be effected mechanically.

An element which is important for the reliable operation of the apparatus is the feeder device by means of which the prawns are supplied to the prawn holder constructed in the form of a disc. The feeder device comprises a vibratory feeder, a sorter which monitors the position of the prawns supplied by the vibratory feeder, and a transmitter device which delivers each prawn individually to a prawn receptacle of the prawn holder. The prawns are segregated at the outlet of the vibratory feeder and fed to the sorter. The sorter examines the continuously supplied stream of single prawns; prawns which do not have the predetermined position are ejected and travel again to the vibratory feeder. The sorter permits only the passage of such prawns which lie in a predetermined position. These accepted prawns are supplied by the transmitter device to the disc serving as prawn holder.

The sorter may also control the dimensions of the prawns, so that for example prawns which are too large or too small are removed from the stream of the single prawns. These ejected prawns may then be supplied by means of appropriate conveyors to a second device, the shelling functions of which are adjusted to these different dimensions.

In a preferred embodiment of the sorter, photo-electric devices scanning the position of the prawns are built in which are connected to a micro-processor comparing the nominal and the actual values of the photo-electric devices and comprising a sorting element which returns to the vibratory feeder prawns which are not perfectly located. The sorting element used is preferably a blower device which produces an air stream directed against the prawn to be ejected.

The prawns which have travelled through the sorter are supplied to the prawn holder disc, by means of the transmitter device. The transmitter device is preferably constructed as a closed duct which terminates in front of the prawn holder disc, and photo-electric devices are arranged at the inlet and at the outlet of the duct, by means of which devices the conveyance of the prawns through the duct and the ready availability of an associated prawn receptacle of the prawn holder disc is controllable. When a prawn has passed the photo-electric device at the inlet end of the transmitter device, it is conveyed through the duct by means of an air stream switched on by the photo-electric device and is shot onto the spikes associated with each prawn receptacle. When leaving the duct the prawn passes the second photo-electric device, whereby the prawn holder disc is rotated further by one synchronous step, until the next following empty prawn receptacle is located with its spikes in front of the outlet end of the duct.

Figure 2:
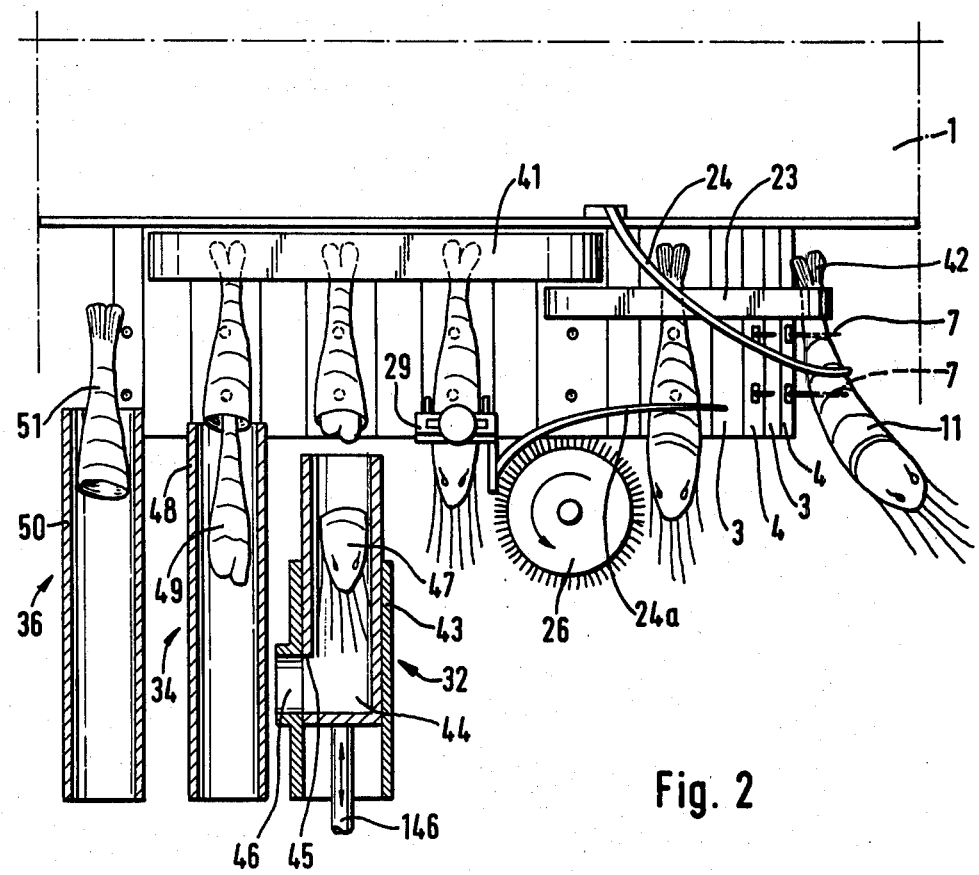

One embodiment of the invention from which further inventive features are clear, is illustrated diagrammatically, by way of example, in the accompanying drawings. There are shown in:

FIG. 1 is a side view of the apparatus; and
FIG. 2 a view from above of the operating region of the apparatus illustrated in FIG. 1, on an enlarged scale.

The apparatus according to FIG. 1 and FIG. 2 has a casing 1 in which are arranged driving elements and assemblies for producing suction and compressed air. Numeral 2 denotes a control box by means of which the apparatus is controlled. A prawn holder constructed in the form of a disc 3 is rotatably arranged on the front side of the casing 1. Prawn receptacles 4 constructed as depressed segments are arranged on the periphery of the disc in a regular distribution.

A disc-like plate 5 is arranged in the disc 3 eccentrically with respect to the axis of rotation of the disc 3. Guides 6 for needle-like spikes 7 are arranged in each prawn retainer and their free ends slide on the outer peripheral surface 8 of the plate serving as a control cam, when the disc 3 rotates about the plate 5. For improving the sliding effect, the inner ends of the spikes may comprise diagrammatically indicated side blocks 9. 10 denotes a compression spring with which each spike may be equipped, in order that a return movement of the guides 6 of the prawn receptacles 4 is possible. Any desired control cam rail may alternatively be substituted for the plate 5.

The eccentricity of the plate 5 is so arranged that the spikes 7 are withdrawn completely from the disc 3, as soon as the respective prawn receptacle 4 has passed the second removal device 34 by means of which the prawn meat 49 is pulled out of the tail shell 51.

Each prawn is supplied to the individual prawn receptacles 4 of the disc 3 by means of a feeder device. The feeder device comprises a vibratory feeder 12, the outlet end of which is associated with a sorter 13. The sorter 13 consists of a duct 14 through which travels every prawn 11, their position being monitored by photo-electric beams crossing the duct. The electrical and optical elements for the photo-electric devices are indicated diagrammatically and denoted by 15. When a prawn does not lie correctly in the feed path, the photo-electric devices deliver, by means of a micro-processor not illustrated in detail, a signal to an electro-magnetic valve 16. Thereby a compressed air stream can be fed through the pipe 17 to the sorter and the incorrectly positioned prawn is blow out of the sorter. In this way prawns which are too large or too small may also be sorted out.

When the photo-electric devices do not register a prawn 11 which differs from the nominal values, the prawn travels to an intermediate conveyor 18 which is constructed in the form of a travelling belt and which accelerates the prawns, so that the spacing between the prawns supplied is extended.

A transmitter is constructed as a passage duct 19 in the same way as the sorter, and includes photo-electric devices with electrical and optical elements 20 and 21 arranged at the inlet end and at the outlet end of the passage duct. When the prawn conveyed into the duct of the transmitter 19 has passed the photo-electric device 20, the magnetic valve 22 is opened by means of an electrical control and the prawn is driven through the duct of the transmitter 19 by means of an air stream produced by the nozzle 123. At the outlet end of the transmitter 19, the prawn is shot onto a spike 7 projecting radially from the disc 3 and, at the same time, the disc 3 is rotated further by the photo-electric device 21 at the outlet of the transmitter far enough for the next following free prawn receptacle 4 with its spike 7 pressed outwardly by the plate 5 to lie in front of the outlet end of the transmitter 19 and to be ready to receive a subsequently supplied prawn. The disc 3 continues to rotate in synchronous step, each prawn receptacle 4 being provided with prawns shot thereupon by the transmitter 19.

As the disc 3 rotates, each spiked prawn 11 travels under a first clamping device which is in the form of an endless toothed belt 23. As illustrated in FIG. 2, the prawn is clampingly held in its end region between the endless toothed belts 23 and the upper side of the disc 3. The prawns are still curved by the cooking process performed after the catch. On the disc which continues to rotate, they are guided against two projecting fingers 24 and 24a, which serve as guiding and spreading elements and which extend and straighten the prawn body.

25 denotes a friction device with a rotating brush 26 which acts upon the extended prawn body. By means of the brush 26 the prawn is additionally rotated about its longitudinal axis into a predetermined position in which the belly side is turned away from the periphery of the disc 3. At the same time the prawn is released from the toothed belt 23 and is then held at its propelling tail 42 by a second rotating toothed belt 41 in a clamping manner between the peripheral surface of the disc 3 and the toothed belt. 27 and 28 are the guide wheels of the toothed belt 41.

Upon further rotation of the disc 3, each thus clampingly retained prawn travels under a cutter mechanism 29, the cutter 30 of which has a semi-circular recess 31, by means of which the shell of the prawn is cut open directly behind the head. The cutter 30 is movable towards the periphery of the disc or the head of the prawn by means of an electro magnet or even a pneumatic cylinder. The cutter moving means is not illustrated in detail.

Upon further rotation of the disc, the head severed by the cutter 30 passes a first removal device 32 which is loadable with a vacuum and which, by means of the vacuum, draws the head of the prawn away from the prawn body and guides it away through the pipe line 33. As shown in FIG. 2, the removal device 32 has a suction mouthpiece which protrudes towards the prawn and which is constructed in the form of a hollow cylinder 44 which is longitudinally displaceable in a sleeve 43. The hollow cylinder 44 has an aperture 45 and the sleeve 43 has likewise a wall aperture 46. When the hollow cylinder 44 is pushed mechanically towards the prawn by means of a piston rod 146, the aperture 45 and the wall aperture 46 are in a mutually overlying position, so that a vacuum applied to the wall aperture 46 has the effect that the head of the prawn 27 is drawn away from the prawn.

Upon further rotation of the disc, the tail of the beheaded prawn continues to be held clamped by the endlessly travelling toothed belt 41, and travels past a second removal device 34.

The second removal device which likewise comprises a suction mouthpiece loadable with a vacuum, drawn the prawn meat 49 of the head-less prawn away and conveys it through a pipe 35 into a collecting container not illustrated.

Upon further rotation of the disc 3, the propelling tail 42 is eventually released by the toothed belt 41, as soon as it passes the rear guide roller 27, so that the tail shell 51, now empty, drops out or is likewise drawn away through a pipe line 37 into a waste container by means of a third removal device 36 with a corresponding suction mouthpiece 50.

In addition to various operating elements, switches and control knobs 38, an electrical counting mechanism is also built into the control box 2; the scales 39 and 40 register the number of prawns 11 shot out by the transmitter 19 and the number of meat parts drawn out of the prawns by means of the second removal device 34. Thereby faults in the course of operation of the apparatus can be registered at once, so that the measures for removing the fault sources may be performed rapidly.

I claim:

1. Apparatus for mechanically shelling prawns, comprising a prawn holder, a feeder device for the continuous positioned supply of individual prawns to the prawn holder, a clamping device operative on the propelling tail of each prawn located in the holder, at least one guiding and spreading element for extending and straightening the clamped prawn, a cutter mechanism which at least partly cuts off the head, a first removal device for removing the head of the prawn, a second removal device for pulling the meat out of the beheaded prawn, and a third removal device for removing the empty shell of the prawn, the prawn holder being arranged to travel past the removal device.

2. Apparatus according to claim 1, wherein the prawn holder is in the form of a disc which is rotatable about a horizontal axis past the removal devices and the periphery of which comprises prawn receptacles in a distributed arrangement.

3. Apparatus according to claim 2, wherein each prawn receptacle is associated with spikes which extend radially out from the disc and are arranged side by side in pairs.

4. Apparatus according to claim 3, wherein the spikes are displaceable radially in relation to the disc, and the ends of the spikes guided in the disc are associated with a control cam which is stationary in relation to the rotating disc.

5. Apparatus according to claim 2, wherein the feeder device, the clamping device, the guiding and spreading elements, the cutter mechanism and the first, second and third removal devices are arranged one behind the other in the direction of rotation of the disc in the region of the periphery of the disc.

6. Apparatus according to claim 2, wherein the clamping device is the lower run of an endless travelling belt which lies against the periphery of the disc in a predetermined region thereof and for which the disc forms the counter support.

7. Apparatus according to claim 2, wherein the guiding and spreading elements are fingers protruding into the path of each prawn carried by the disc.

8. Apparatus according to claim 7, wherein additionally a friction element is provided adjacent the protruding fingers and contacts the surface of each prawn guided past.

9. Apparatus according to claim 2, wherein the cutter mechanism comprises a cutter which is displaceable radially and axially relatively to the disc in a synchronous manner upon the passage of each prawn receptacle and which has a recess of approximately the same diameter as the diameter of a prawn.

10. Apparatus according to claim 2, wherein at least the first and second of the three removal devices are suction mouthpieces loadable with a vacuum, arranged co-axially with the prawn receptacles.

11. Apparatus according to claim 10, wherein the suction mouthpiece of the first removal device is axially reciprocable in synchronism with the rotation of the disc.

12. Apparatus according to claim 2, wherein the feeder device comprises a vibratory feeder, a sorter which monitors continuously the position of prawns supplied by the vibratory feeder, and a transmitter which delivers each prawn guided by the sorter singly to each prawn receptacle.

13. Apparatus according to claim 12, wherein the sorter includes photo-electric devices which scan the position of each prawn in the sorter and which are connected to a micro-processor comparing nominal and actual values of the photo-electric devices and controlling a sorting element which returns prawns not perfectly positioned, to the vibratory feeder.

14. Apparatus according to claim 13, wherein the sorting element is a blower device which produces an air stream directed against the prawn to be returned.

15. Apparatus according to claim 12, wherein the transmitter comprises a duct terminating in front of the disc and through which the prawns are conveyed by means of compressed air, and photo-electrical devices arranged at the inlet and at the outlet of the duct by means of which on the one hand the conveyance of an individual prawn through the duct and on the other hand the ready supply of an associated prawn receptacle is controllable.

* * * * *